United States Patent [19]

Dufour et al.

[11] Patent Number: 5,233,670
[45] Date of Patent: Aug. 3, 1993

[54] METHOD AND DEVICE FOR THE REAL-TIME LOCALIZATION OF RECTILINEAR CONTOURS IN A DIGITIZED IMAGE, NOTABLY FOR SHAPE RECOGNITION IN SCENE ANALYSIS PROCESSING

[75] Inventors: Jean-Yves Dufour, Chatillon sous Bagneux; Serge Le Gall, Malakoff; Hugues Waldburger, Meudon, all of France

[73] Assignee: Thomson TRT Defense, Guyancourt, France

[21] Appl. No.: 733,807

[22] Filed: Jul. 22, 1991

[30] Foreign Application Priority Data

Jul. 31, 1990 [FR] France .................. 90 09742

[51] Int. Cl.[5] ............................ G06K 9/48
[52] U.S. Cl. ...................... 382/22; 382/27; 382/41
[58] Field of Search .......... 382/22, 27, 54, 52, 382/25, 41

[56] References Cited

U.S. PATENT DOCUMENTS

| | | |
|---|---|---|
| 4,843,630 | 6/1989 | Catros et al. .................. 382/22 |
| 4,910,786 | 3/1990 | Eichel .......................... 382/22 |
| 4,965,842 | 10/1990 | Crossley et al. ............... 382/22 |
| 5,050,227 | 9/1991 | Furusawa et al. ............... 382/22 |
| 5,068,908 | 11/1991 | Inoue et al. ................... 382/22 |
| 5,142,592 | 8/1992 | Moler .......................... 382/22 |

FOREIGN PATENT DOCUMENTS

| | | |
|---|---|---|
| 229543 | 6/1985 | European Pat. Off. . |
| 279297 | 4/1990 | European Pat. Off. . |
| 8703118 | 4/1987 | World Int. Prop. O. . |

Primary Examiner—Joseph Mancuso
Attorney, Agent, or Firm—Pollock, VandeSande & Priddy

[57] ABSTRACT

Apparatus and method to localize rectilinear contours in a digitized image for recognizing shapes at a scene. The gradient of the gray level function of the image at the position of each pixel is determined, and those pixels which constitute a contour pixel are identified. The identified contour pixels are complemented with filler pixels where discontinuities are found. The neighborhood of pixels about a contour pixel is compared with a series of characteristic pixel configurations to determine if a correspondence exists with the characteristic configurations. In this way, rectilinear contour pixels are identified.

9 Claims, 5 Drawing Sheets

METHOD AND DEVICE FOR THE REAL-TIME LOCALIZATION OF RECTILINEAR CONTOURS IN A DIGITIZED IMAGE, NOTABLY FOR SHAPE RECOGNITION IN SCENE ANALYSIS PROCESSING

BACKGROUND OF THE INVENTION

1. Field of the Invention

The present invention relates to a method and a device to localize reclinear contours in a digitized image.

The invention shall be described chiefly in the context of an application to the analysis of a scene in which it is sought to recognize shapes characterized by rectilinear contours.

It is thus, for example, that when it is sought to localize man-made objects (roads, bridges, railways, canals etc.) in a natural environment, in infrared images produced by a camera placed on board an aircraft, such objects when observed generally appear in a polygonal shape. As a typical application, we might cite path-correction operations in aircraft navigation.

This application to shape recognition does not, however, restrict the scope of the present invention, which can also be used for other applications necessitating the extraction of dots of rectilinear contours, for example stereovision applications.

In general, image processing is done in three steps, namely:

the search for the dots that may belong to rectilinear contours;

the analytical description of the segments formed by these dots, and the grouping of the various segments, thus detected and analyzed, that belong to one and the same object being searched for.

The invention relates to the first one of these steps, namely the preliminary search, in the unprocessed image, for rectilinear contours and the distinguishing of these contours from the other dots of the image. The results produced by the method and device of the invention will then be used as the basis for the downline processing corresponding to the next two steps.

2. Description of the Prior Art

Up till now, the processing algorithms and the types of physical architecture used have not provided for a localization, such as this, of the rectilinear contours in real time (namely at the video rate of the images produced) and have been even less capable of providing for the full processing of the image, as constituted by the three steps mentioned here above.

SUMMARY OF THE INVENTION

Thus, one of the aims of the invention is to propose a particular method of processing, with an architecture adapted thereto, enabling this processing of the localization of the rectilinear contours to be done in real time.

It shall be seen, in particular, that the processing operations all have a local character (namely, the analysis or processing of a given pixel is done solely as a function of the pixels located around it in a limited neighborhood, typically a neighborhood in the range of 3×3 to 9×9).

This makes it possible to achieve relative simplicity in the processing to be done, unlike in prior art methods which generally make it necessary to consider the entire image, thus making it necessary to provide for an architecture that is relatively complicated and costly in terms of circuits (with large-capacity frame memories, a large volume of computations etc.).

In the detailed description of the invention, attention will also be drawn to the adaptive character of the processing operations with respect to the contents of the image. This characteristic enables a notable improvement in the quality of these processing operations.

To this effect, the present invention proposes a method to localize rectilinear contours in a digitized image, notably for the recognition of shapes in a scene analysis processing operation, said image being formed by a two-dimensional frame of pixels each exhibiting a determined gray level, wherein said method comprises the steps of:

(a) the approximating, for each pixel, of the gradient of the gray level function of the image at the position of the pixel, the gradient being defined by an argument, representing an element of information on direction, and by a norm, representing an element of information on the amplitude of the transition of the gray level in this direction, (b) the extracting, from among all these pixels, of a sub-set of contour pixels, where each contour pixel corresponds to a local maximum of the gray level function in the direction of the gradient, this maximum being determined from said information on amplitude of transition, (c) the complementing, of this sub-set of contour pixels, by interposed filler pixels should there be a discontinuity of the corresponding contour in a given neighborhood, and (d) the performing, for each contour pixel or filler pixel, of a comparison of the neighborhood of this pixel with a series of characteristic configurations and the designating of the corresponding pixel as being a rectilinear contour pixel if and only if this comparison determines a correspondence of the neighborhood of this pixel with one of these characteristic configurations.

An object of the invention is also a device that is constituted by means that enable the implementation of these functions, and in which the localizing of the rectilinear functions is then advantageously done in real time at the video rate.

In a preferred embodiment, the neighborhood considered at step (d) includes two concentric and non-contiguous square crowns defined around the contour pixel or filler pixel considered, notably the 5×5 crown and the 9×9 crown surrounding the contour pixel or filler pixel.

Preferably, the step (a) for the approximation of the gradient is performed by convolution of the gray level function of the image with the gradient of a smoothing function. This smoothing function may notably be a Gaussian function.

Advantageously, after the step (a), a thresholding is done on the norm of the gradient, the value of this norm being forced to zero if the norm is below a given threshold. This thresholding operation is then preferably an adaptive thresholding operation, the respective thresholds being determined as a function of the mean of the norm of the gradient on the previous image.

BRIEF DESCRIPTION OF THE DRAWINGS

An embodiment of the invention shall now be described with reference to the appended drawings.

DESCRIPTION OF THE PREFERRED EMBODIMENT

General Presentation of the Processing

Figure 1:
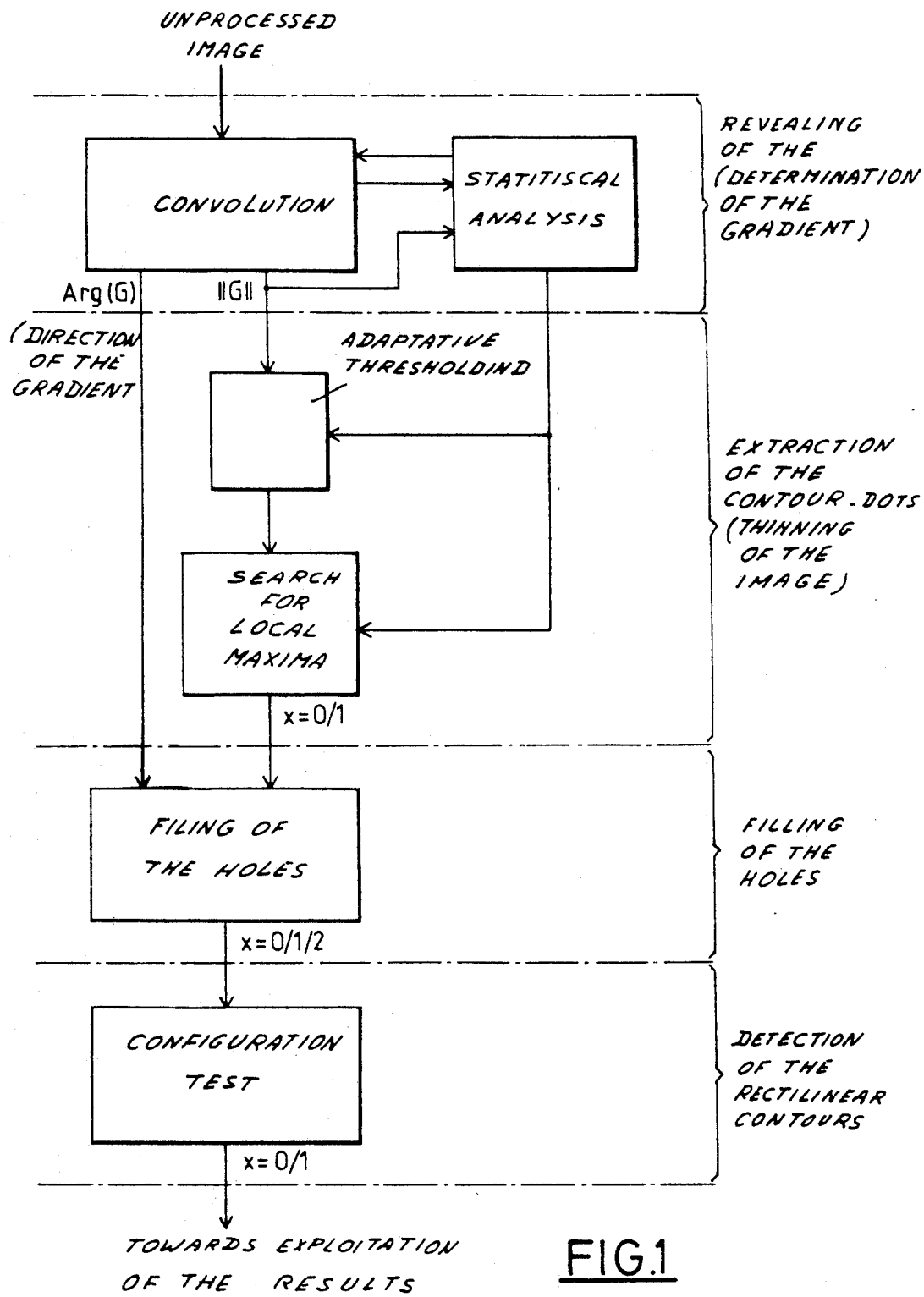
FIG. 1 is a diagram giving a schematic explanation of the sequencing of the different steps of the processing of the method of the invention.

FIG. 1 shows the sequencing of the different steps of the method of the invention. These steps shall subsequently be described in detail.

The method processes an image formed by a two-dimensional frame of pixels each exhibiting a determined gray level, for example the image delivered by a video camera such as an air-ground infrared camera on board an aircraft.

From this unprocessed image, in the step referenced "revealing of the contours", for each pixel, the gradient of the gray level function of the image analyzed (or an approximation of this gradient) will be determined.

Thus, for each pixel, a complex value (i.e. in other terms, a vector) will be defined, said vector containing, for each dot, two information elements, namely:

a measurement of the local transition of the gray levels in the vicinity of this point, represented by the norm $||G||$ of the gradient vector, and an estimation of the direction in which this transition is made, represented by the argument Arg(G) of the gradient vector; should a contour be effectively present in the neighborhood of this dot the gradient direction will be perpendicular to the direction of the contour.

The next step, referenced "extraction of the contour dots" consists in keeping only the dots corresponding to local maxima of the image formed by the norm $||G||$ of the gradient, for example local maxima in a 3×3 neighborhood, in keeping only the "peak lines" of this image.

At output, then, a binary value "0" or "1" is assigned to each pixel of the image, depending on whether it has been determined (in the manner that shall be indicated further below) that this dot belongs to a contour or does not belong to it.

Furthermore, to eliminate contour dots of little significance, and to attenuate the influence of the noise, a thresholding is done on the image-gradient as a function of the norm of the vectors, the gradient vector being forced to zero if its amplitude is below a given threshold.

Advantageously, the threshold thus considered is an adaptive threshold, determined as a function of the norms of the gradient vectors, said norms having been analyzed statistically in the previous image.

The next step, referenced "filling of the holes" consists in eliminating the discontinuities that may be encountered along a given contour.

This filling admittedly has the drawback of slightly thickening the contour, but it is necessary for the efficient performance of the next step, namely the configuration testing step, which is extremely sensitive to the presence of holes or small uneven features in the extracted contours.

Thus, at output, there is obtained a continuous contour formed by a series of pixels to which there will have been assigned the value "3" (original contour pixel) or "1" (filler pixel, initially null), the value "0" corresponding an initially null and unfilled pixel (hence a pixel that will never be considered as belonging to a contour).

The fourth and last step of the processing operation, referenced "detection of the rectilinear contours" consists in performing a configuration testing or pattern matching operation designed to determine, for each pixel belonging to a contour, whether this pixel belongs to a rectilinear contour (in which case it will be assigned the value "1") or not (in which case it will be assigned the value "0".

This test is done, as shall be explained further below, by comparing the neighborhood of the pixel considered with reference neighborhoods (also called "configurations" or "masks") each reference configuration being characteristic of a segment of a given direction.

The image obtained a output after this step shall thus be constituted exclusively by pixels belonging to rectilinear contours.

Each of the different steps of the processing operation shall now be described in detail.

Revealing the Contours (Determination of the Gradient)

This step shall be performed by applying an operator to the value (gray level) of each pixel of the image. The response of this operator at any dot will be all the higher a this dot is located at a major local transition of the gray level function of the analyzed image.

To avert disturbances due to noise and to local unevennesses of the image, the operator used will advantageously be an operator carrying out an approximation of the gradient G(x,y) of the image J(x,y) obtained by convolution of the image function I(x,y) with a smoothing function W(x,y) of a statistical character.

To this effect, it is possible to use a variety of smoothing functions which may or may not be Gaussian functions, isotropic or non-isotropic Gaussian functions, or Gaussian functions with or without diagonal covariance matrix.

It is possible, for example, to use the following isotropic Gaussian function:

$$W_{94}(x,y) = 1/(2\cdot\pi\cdot\sigma)\cdot\exp[-(x^2+y^2)/2\cdot\sigma^2]$$

the gradient function of which will therefore be:

$$\nabla W_\sigma = -1/\sigma^2\cdot(x,y)\cdot W_\sigma(x,y)$$

The value of the gradient sought is given by:

$$G(x,y) = \nabla(W*I)(x,y)$$

It will be noted that this latter expression may be also written in the form:

$$G(x,y) = (\nabla W * I)(x,y)$$

It is therefore seen that it suffices to convolute the image function I with $\nabla W$ to obtain the gradient value G sought.

In practice, the smoothing function chosen will preferably be a function $W(x,y)$ such that the values $||\nabla W(x,y)||$ assumed by the standard of its gradient may be considered to be negligible outside a square C centered on the origin and having a fixed size. In other words, the integral of the function $||\nabla W(x,y)||$ computed in the square C should be close to the integral computed throughout the plane $R^2$. The convolution core will then be constituted by the restriction of the vector function $\nabla W$ to the square C. The size of the square C (typically $5 \times 5$ or $9 \times 9$) will depend on the signal-to-noise ratio of the images processed and on the nature of the objects sought.

The gradient thus computed shall be defined at any point by its norm (measurement of the amplitude of the transition of the gray level at the dot considered) and by its argument (giving an estimation of the direction in which this estimation is made).

It will be noted that the norm of the gradient vector may also be likened to a coefficient of likelihood assigned to the estimation of the direction of the gradient at the dot processed. In other words, if the norm is a very low-value norm, the estimated direction will be highly random whereas if, on the contrary, it is high (with a very sharp transition), the estimation of the direction will certainly be more realistic.

It will also be noted that the gradient direction is defined in the interval [0, 180°] (the direction of the vector is therefore not kept).

Extraction of the Contour Dots

This step is aimed at determining the presence of a contour by the search for the local maxima of the norm of the gradient in the direction of this gradient (hence in a direction perpendicular to the direction of the contour if the dot considered is a contour dot).

The test is performed on the basis of the following definition (assuming the gray level function to be continuous): a dot M with coordinates (x,y) is a contour dot if and only if the relationship:

$$G(x,y) > G(x',y')$$

is verified for every dot (x',y') belonging to a given neighborhood of the dot (x,y) and located on the straight line supporting the vector G(x,y).

Figure 2:
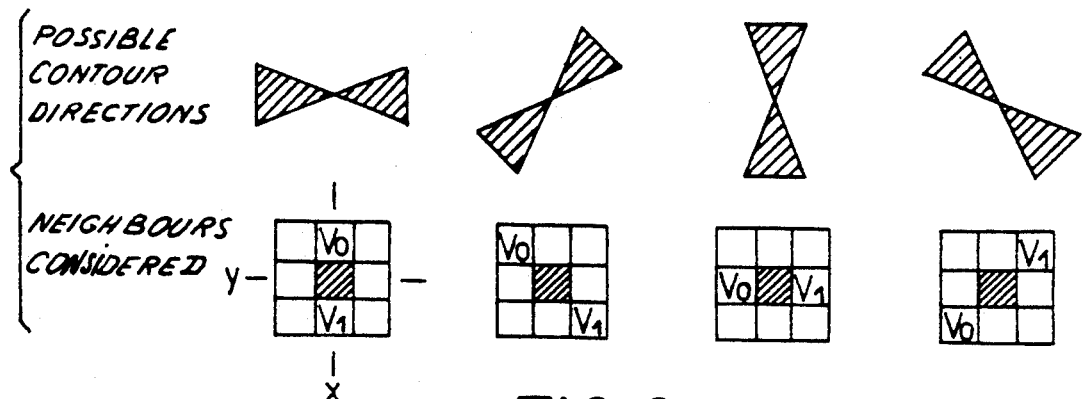
FIG. 2 illustrates one of the sub-steps of the step for extracting the contour dot.

In practice, as shown in FIG. 2, a $3 \times 3$ neighborhood will be considered and it will be decided that the dot M(x,y) is a contour dot if and only if the relationship:

$$G(x,y) \geq G(x_0,y_0) \text{ et } G(x,y) \geq G(x_1,y_1)$$

is verified $(x_0,y_0)$ and $(x_1,y_1)$ being the respective coordinates of the neighboring dots $V_0$ and $V_1$, located in a $3 \times 3$ mask centered on the dot M(x,y), symmetrically arranged with respect to this dot M and having an orientation as a function of the direction of the gradient G(x,y).

With respect to the latter condition, the four possible cases are illustrated in FIG. 2 as a function of the gradient vector.

If the pixel (x,y) verifies the condition indicated here above, it is assigned the binary value "1", i.e. it is decided that this pixel belongs to a contour; if not, it is assigned the value "0", i.e. it is considered that this pixel does not belong to a contour.

It will be noted that, to eliminate the contour dots having little significance and to attenuate the influence of the noise, an adaptive thresholding operation is carried out (before the search for the local maxima) forcing the norm of the gradient vector to zero if this norm is below a given threshold which is very advantageously a threshold servo-linked to a statistical value obtained from the modules of the gradients of the pixels of the previous image.

Filling of the Holes

Since the configuration test is extremely sensitive to the presence or holes or small uneven features in the contours extracted, the discontinuities have to be removed from these contours by the addition of complementary pixels at the positions of these discontinuities. However, it will be sought to reduce the thickening of the contour, resulting from this addition of pixels, to a minimum.

Figure 3:
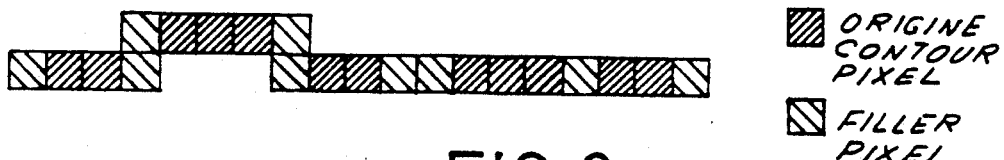
FIG. 3 illustrates the step for filling the holes of the contour.

The principle of this filling operation, illustrated schematically in FIG. 3, consists in extending the segments by an additional filling pixel. This filling will, however, be done only if the filling pixel added is adjacent to an original contour pixel.

In practice, the operation is done by considering $3 \times 3$ neighborhood of the pixel $I_0$, this neighborhood V being formed by the pixels $I_1$ to $I_8$, written as follows:

$$V = \begin{matrix} I_1 I_2 I_3 \\ I_8 I_0 I_4 \\ I_7 I_6 I_5 \end{matrix}$$

It will then be said that the dot I should be filled if and only if:

1) its amplitude is null AND
2) if:
   one of the pixels $I_1$ or $I_5$ has a non-null amplitude and a direction close to 45° (a direction that shall be defined as being a direction oriented to 45°, if a quantification step of 22.5° has been selected as in the chosen example);

OR one of the pixels $I_4$ to $I_8$ has a non-null amplitude and a direction close to 90° (a direction that shall be defined as being a direction oriented to 90°, (90+22.5)° or (90−22.5)°),

OR one of the pixels $I_3$ to $I_7$ has a non-null amplitude and a direction close to 135° (a direction that shall be defined as being a direction oriented to 135°),

OR one of the pixels $I_2$ to $I_6$ has a non-null amplitude and a direction close to 0° (a direction that shall be defined as being a direction oriented to 0, 22.5° or −22.5°).

It will be noted that, in order to obtain a non-overlapping division of the interval $[0.2\pi]$, a tolerance of ±22.5 has been assigned only to the directions 0° and 90°.

Advantageously, this set of conditions can be defined in the form of a single logic equation.

To this effect, it is possible to envisage a coding of the pixels to be processed in the following form:

* $C(x,y) = 0$ if the pixel (x,y) is not a contour dot, and

* $C(x,y) = 2^{(7-n)}$ if the pixel is a contour dot, n designating the integer from 0 to 7 such that the direction of the gradient at the point (x,y) (direction quantified by 22.5° steps) is equal to n×22.5.

In other words, if the amplitude of the pixel shows that it belongs to a contour (non-null value), this pixel is represented by a byte in which one and only one bit is positioned, the position of this bit in the byte representing the coded direction.

It is then enough to search for the correspondence between the corresponding values and a set of four masks, corresponding to each of the four respective directions considered:

$MD_1 = 00100000$: mask of the directions close to 45°
$MV^1 = 11000001$: mask of the directions close to 0°
$MD_2 = 00000010$: mask of the directions close to 135°
$MH^2 = 00011100$: mask of the directions close to 90°

In again taking up the neighborhood notations $I_0 \ldots I_8$ and in writing the coding of the pixel $I_i$ as $C_i$, the filling condition may then be represented by the following logic expression, where "∩" represents a logic AND and "∪" represents a logic OR:

$$(C_0=0) \cap \{[((C_1 \cup C_5) \cap MD_1) \cup ((C_2 \cup C_6) \cap MV) \cup ((C_3 \cap C_7) \cap MD_2) \cup ((C_4 \cup C_8) \cap MH)] \neq 0\}$$

If this expression is TRUE, then there are grounds for assigning a value corresponding to a filler pixel (value "1") to the corresponding pixel.

If not, the filling will not be done, the pixel will keep the value "0" if it is not a contour dot, and will assume the value "3" ('11' in binary notation) if it is a contour dot.

Detection of Rectilinear Contours (Configuration Test

This step consists in checking to see whether, at each dot M with coordinates (x,y) belonging to a contour, the contour dots and the filler dots present in a given neighborhood of this dot M(x,y) are capable of constituting straight-line segments passing through this dot M—in which case, it will be decided that this contour dot M belongs to a rectilinear contour.

To this effect, the neighborhood of each dot M is compared with a certain number of "neighborhood masks" or different reference configurations, supposed to approximate a rectilinear contour segment.

If it is determined that there is an effective correspondence of the neighborhood studied with any one of these reference configurations, then it is decided that there is effectively a rectilinear contour present.

The choice of the neighborhood considered is important.

First of all, it is quite clear that the more extensive the neighborhood, the more difficult will it be to physically set up the circuits, since the increase in the number of parameters to be taken into account will lead to the increasing complexity and sizing of the circuits.

But, above all, solely from the viewpoint of the quality of the processing, while the increase in the size of the mask results in greater precision in the estimation of the rectilinear character of the segments chosen (an extensive neighborhood makes it possible to more clearly distinguish between an effectively linear contour and a slightly curvilinear contour), it produces, on the other hand, an erosion of the segments detected, for the ends of the contour recognized as being rectilinear will be eliminated over a length corresponding to half the size of the neighborhood mask.

It is therefore necessary to find a compromise between these different considerations.

In practice, it has been observed that a neighborhood mask with a dimension of 9×9 makes for a satisfactory choice in most cases.

Furthermore, to limit the complexity of the computations, instead of keeping all the 9×9=81 pixels constituting the neighborhood of the pixel considered, it is advantageously possible to limit the mask to two concentric and non-contiguous crowns, the first one consisting of a 5×5 crown, one pixel wide, and the second one consisting of a 9×9 crown, also one pixel wide.

Figure 4:
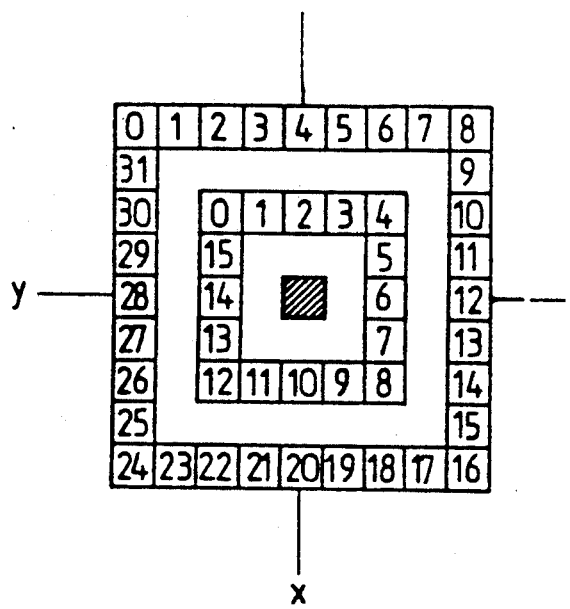
FIG. 4 shows the two concentric crowns defining the neighborhood used during the configuration testing step.

These two crown have been illustrated in FIG. 4, and it is thus seen that it is possible to be satisfied with making a study of only one set of 48 dots, i.e. only about half of a full neighborhood of 81 pixels.

Figure 5:
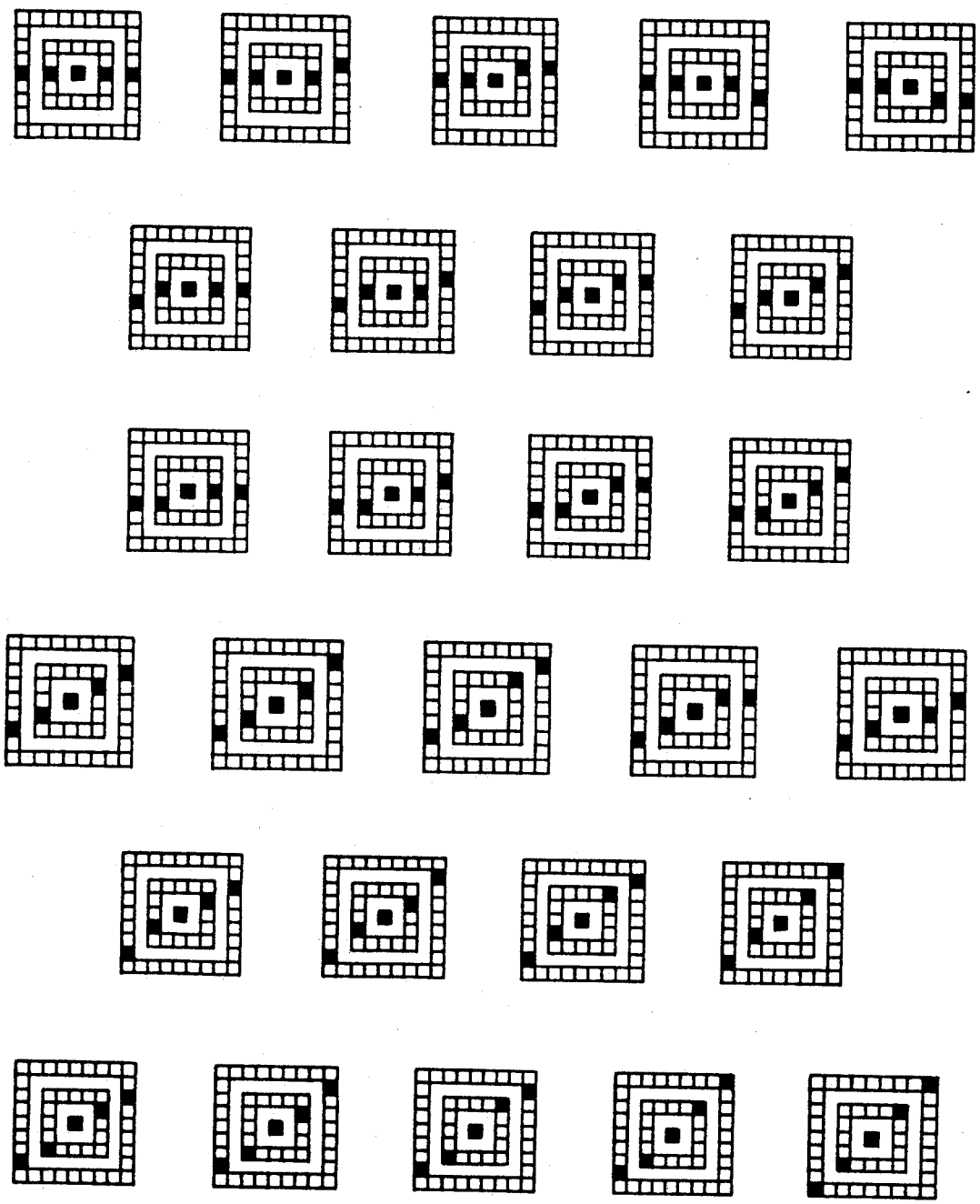
FIG. 5 shows part of the masks corresponding to the different configurations characterizing a rectilinear contour.

FIG. 5 shows a part of the set of neighborhood masks for which it is considered that there is effectively a rectilinear contour.

The sub-set of masks shown in FIG. 5 corresponds to contour segment directions forming an angle of 0° to 45° with the horizontal (with the conventions of the figure).

The other masks of the set are deduced simply from the sub-set shown in FIG. 5 by vertical and horizontal axis symmetries and rotations of one quarter turn, in order to cover all the directions from 45° to 360°.

Thus, 102 different masks are obtained. If the neighborhood formed by the 48 dots of the two 5×5 and 9×9 crowns of the pixel considered matches any one of these 102 configurations, then the central pixel will be considered to be a rectilinear contour pixel.

To simplify the computation, it is possible to combine all these configurations in the form of a limited set of logic equations.

Thus, the testing of one (i) of the n configurations may be done by a logic equation of the form:

$$L(i) = B_0 \cap B_1(i) \cap B_2(i) \cap B_3(i) \cap B_4(i),$$

where:

$B_k(i)$ is TRUE if and only if the pixel located in the $k^{th}$ element of the configuration is non-null, and $B_0$ is TRUE if and only if the processed pixel is a contour dot.

The result of the test is given by a logic OR on the results of all the tests L(i):

$$L = \underset{i=1 \ldots n}{V} L(i)$$

Let EC (external crown) and IC (internal crown) be the logic vectors defined as follows:

EC[i]=1 if and only if the $i^{th}$ element of the external crown is non-null,

IC[i]=1 if and only if, for i as an even number value, the $(i/2)^{th}$ element of the internal crown is non-null, and IC[i]=1 if and only if, for i as an odd number value, the $(i-1)/2)^{th}$ or the $(i+1)/2)^{th}$ element of the internal crown is non-null.

Besides, if A and B designate two logic vectors:
A[i]=A[i−1]∪A[i]∪A[i+1],
(A∩B)[i]=A[i]∩B[i],
VA=A[0]∪A[1]∪ ... ∪A[n−1],
A+ =(A[n−1], A[0] ... A[n/2−1] (namely the upper half of the components), and $A_- = (A[n/2-1], A[n/2] \ldots A[n-1])$ (namely the lower half of the components), The test can then be factorized in the form:

$$L = B_0 \cap V(EC \cap IC) + \cap (EC \cap IC)-)$$

In other words, an examination is made to find out if there are two neighboring elements located respectively on the internal crown and the external crown (test $(EC \cap IC)+$) then whether, in the opposite direction, there are also two neighboring elements located respectively on the internal crown and on the external crown (test $(EC \cap IC)-$) and finally a test a made to see whether these two half-segments are located in mutually facing positions (overall test $(EC \cap IC)+ \cap (EC \cap IC)-)$).

This overall test is carried out for each of the n points of the neighborhood considered (general operator or V).

If this overall OR is TRUE and if the central pixel is a contour dot ($B_0$ TRUE), then the contour to which the pixel belongs is a rectilinear contour.

Once this processing has been done for all the pixels of the image, the process is completed, and the original unprocessed image is then reduced solely to the rectilinear contours thus distinguished.

Architecture for the Implementation of the Processing in Real Time

Figure 6:
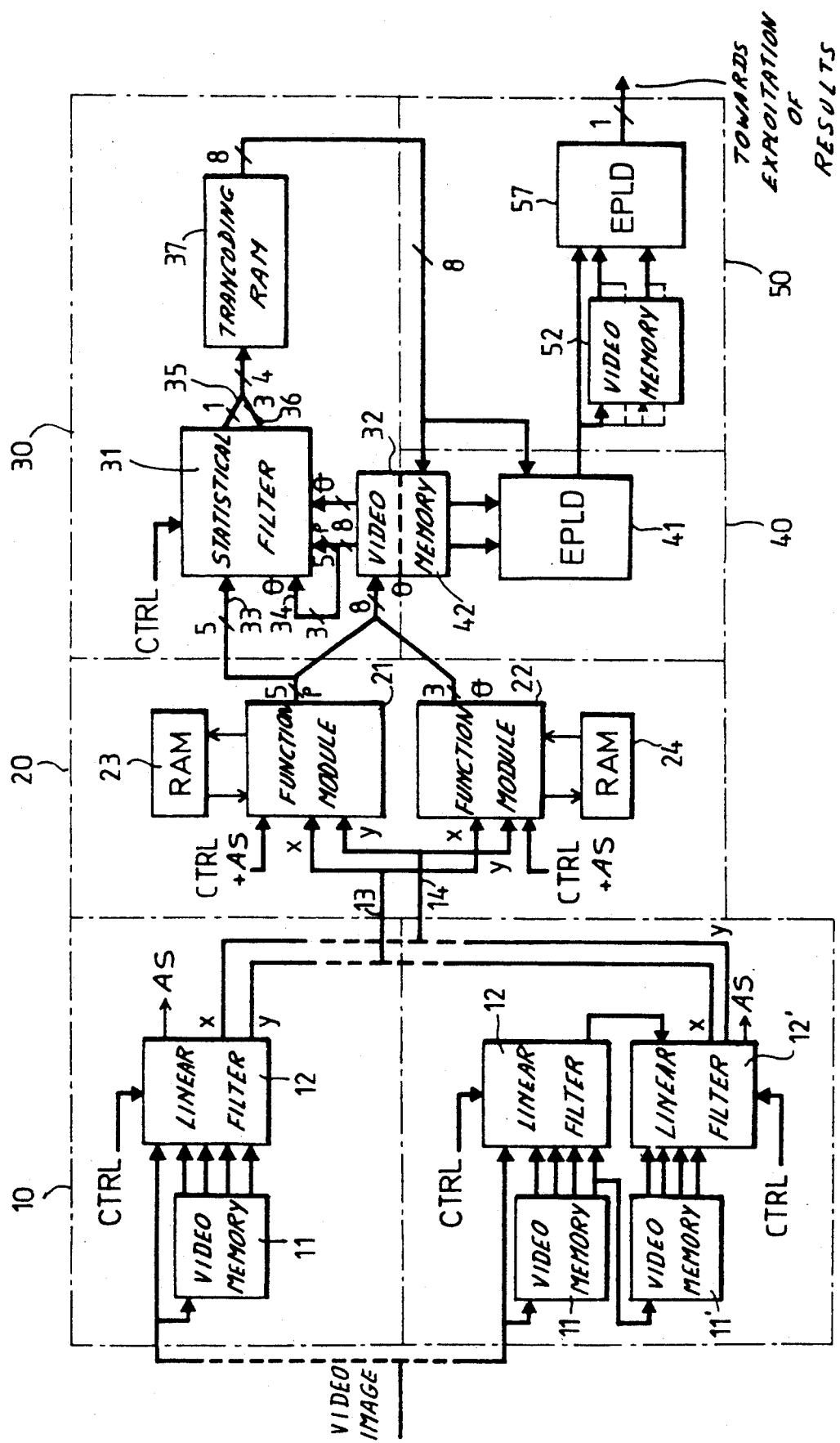
FIG. 6 is a block diagram illustrating a preferred architecture enabling the real-time implementation of the processing shown schematically in FIG. 1.

Referring to the block diagram of FIG. 6, a description shall now be given of an architecture of circuits capable of carrying out the processing operations, of the above-described process, in real time.

Indeed, the processing algorithms described further above have been chosen in order to enable this real-time processing, given the very high rates which may go up to 20 MHz for the rate of the pixels.

The first stage 10 or 10' receives the unprocessed image (namely all the pixels of a frame with, for each of them, an inherent gray level) and carries out the approximation of the gradient by a convolution operation as indicated further above.

FIG. 6 shows two possible approaches (blocks 10 and 10') for this stage, side by side. These two blocks correspond respectively to a 5×5 and 9×9 size of cores. Naturally, only one of the two circuits will be used, the choice of the circuit depending in fact on the core size chosen, as a function of the image studied (the signal-to-noise ratio and the nature of the objects sought).

This stage, in either of its forms, is made from two circuits 11 (or 11 and 11') and 12 (or 12 and 12') which are universal VLSI circuits developed within the framework of the European program EUREKA ("MIP" project; No. EU34: Modular Image Processing).

The video memory used by the invention is the Video Memory MIP circuit, which is a memory circuit designed for the organization of the data for the Linear Filter MIP circuit (linear filter 12) and also for the Sorting Filter MIP circuit (sorting filter 31 used further below in the architecture).

This video memory circuit enables the memorizing of four video lines of 1024 pixels each (maximum size), each pixel being capable of being coded on eight gray level bits. Thus, at the video cadence, it can deliver a column of five pixels (the four pixels stored plus the current pixel) to a linear filter or to a sorting filter placed downline.

This memory can also be split up into two sub-memories supplied separately by two distinct video signals.

Each half-memory then memorizes two video lines for each of the signals.

The length of the lines can be programmed by external command, with a maximum size of 1024 pixels.

The Linear Filter MIP circuit, for its part, is a dedicated circuit that can be used to carry out the convolution of an image E with a mask K according to the relationship:

$$C(n,m) = \Sigma E(n+1, m+j) \cdot K(i,j)$$

This circuit has the following functional characteristics:
processing neighborhood: 5×10,
two possible modes of operation: "real" mode (single convolution) and "complex" mode (two simultaneous convolutions with two different masks),
programmable video format (line return, frame return),
maximum video rate: 20 MHz,
input: five 8-bit pixels,
output: 16 bits (in real mode) or 24 bits (2×2 bits in complex mode),
possibility of integrated post-processing operations:
the adjusting of the outputs by a transformation of the following type $$S(n,m) = a \cdot C(n,m) \cdot 2^b + c,$$

with a, b and c programmable,
thresholding: the values below a given threshold may be forced to zero, the values above this threshold being kept in their state, or forced to 1 depending on the thresholding mode;
computation of histogram, and
search for the minimum and for the maximum on the results.

In the particular use of the invention, the linear filter 12 is associated with the video memory 11 to perform the desired convolution. CTRL symbolizes the different parametrization commands applied to the linear filter: mask coefficients, programming of the circuit, values of gain and offset for the adjustment.

In the case of a 9×9 neighborhood (circuit 10'), two linear filters 12, 12' are associated in cascade, these filters being associated with two video memories 11, 11' also associated in cascade.

The statistical stage incorporates a linear filter enabling the analysis of the results delivered at output by this filter.

In the case in point, the operation involves assessing the statistics of the module of the gradient of the gray level function of the image. For this purpose, a real-time computation is done of a 16-level histogram on the maximum of the absolute values of the real part and of the imaginary part (the linear filter working in complex mode).

This estimation, as well as the maximum and minimum values of this magnitude, will enable the servo-linking of the thresholding operation to the gradient as well as the binarization, at output, of the thinning module (see further below).

The outputs delivered by the linear filter 12 or 12' on the lines 13 and 14 have a complex Cartesian form.

To enable this information to be exploited, a certain number of operations have to be carried out pixel after pixel. These are:

first of all, a conversion of Cartesian coordinates (x,y) into polar coordinates $(\rho,\theta)$, including an extension of dynamic range, a thresholding operation to eliminate a part of the noise on the result on the estimation of the gradient (for, it has been seen that, if the module of the gradient is low, the estimation of the direction is marred by a high degree of uncertainty; it is therefore necessary to eliminate the non-significant values by forcing them to zero); the adaptive threshold SA will be calculated on the basis of the statistical data given by the linear filter, and a quantification making it possible to optimize the distribution of the values of the angle $\theta$ on three bits (this step conditions the efficiency of the thinning operation performed further below).

These processing operations, which imply non-linear operations, may be carried out entirely by two Function Module type MIP circuits 21 and 22, associated with respective RAMs 23, 24.

More precisely, the MIP function module is designed for the approximation of any two-variable continuous function to the video rate. To this effect, the RAM that is associated with it contains the values of the function on a sampling of dots $(X_i, Y_j)$, with $0 \leq i \leq I$ and $0 \leq j \leq J$. The function module determines the value of the function for (X, Y) by a bilinear or linear interpolation.

The following are its characteristics:
the storage of the values of the function on a 128×128 grid,
maximum video rate: 20 MHz,
inputs: 2×12 bits,
output: 12 bits.

In the case in point, the stage 20 has a first function module 21 receiving, as an input, the coordinates x and y, each on 12 bits, and delivering, at output, the value $\rho$ corresponding to the gradient norm $||G||$ of FIG. 1.

A second function module receives the same inputs and delivers, at output, the value $\theta$ corresponding to the gradient argument Arg(G) of FIG. 1.

Only the top parts of the outputs will be taken into account, namely 5 bits for the norm o and 3 bits for the argument $\theta$.

The control signals CTRL enable, in particular, the loading, into the respective RAMs 23, 24, of the values of the non-linear functions desired. They include the adaptive threshold AS delivered by the linear filter 12 or 12' of the preceding stage 10.

The adaptive thresholding may be done by using the fact that the function module enables access to several functions by an input selection (typically 16 functions). It is possible, for example, to choose eight different types of conversion and to quantify the space of the thresholds on the basis of these functions.

The function of the next stage 30 is to achieve the extraction of the contour dots (thinning of the image to its contours alone). As explained further above, notably with reference to FIG. 2, the processing neighborhood here is a 3×3 neighborhood, and the statistical type of operation depends on the orientation of the gradient.

This operation for the extraction of the contour dots is done by means of another MIP circuit which is the sorting filter (statistical filter) 31, combined with a two-line video memory 32 (to have the 3×3 neighborhood) made herein in the form of a half-memory of a video memory MIP component.

Figure 7:
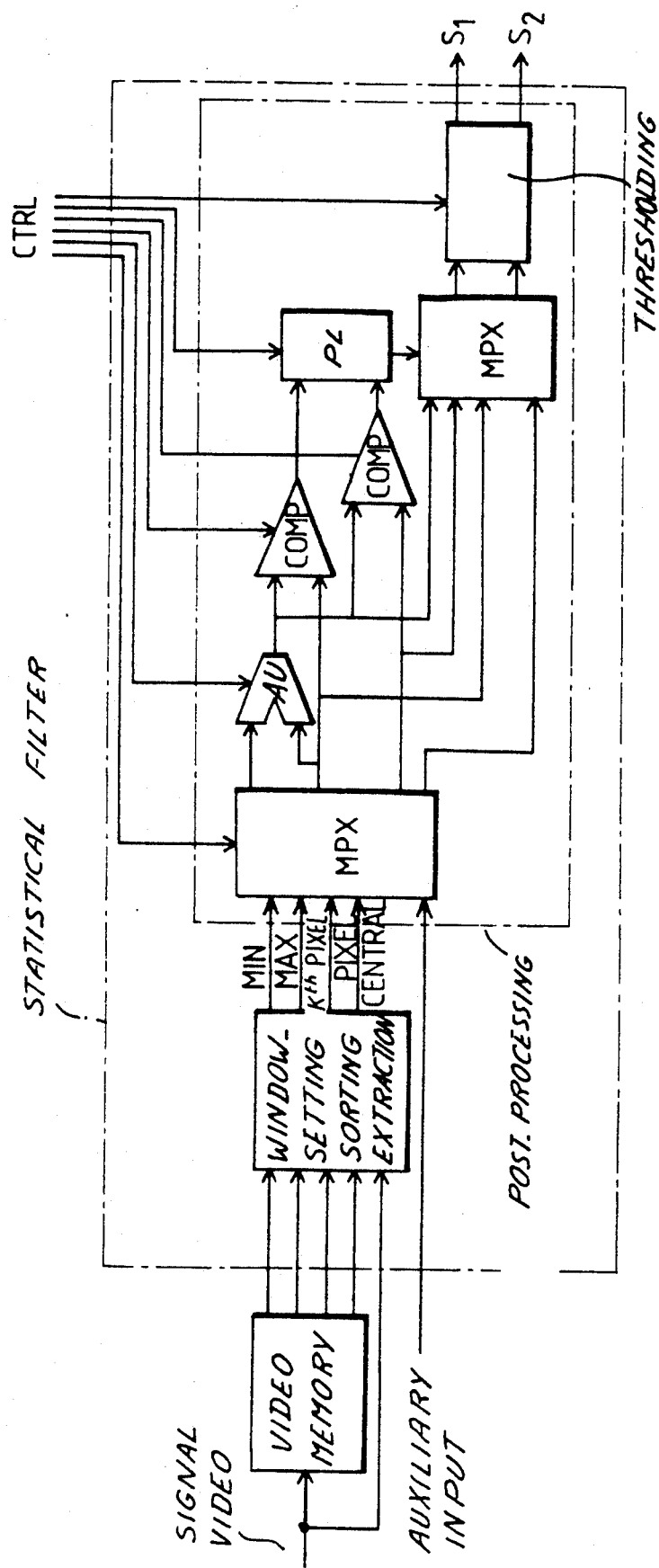
FIG. 7 shows the internal organization of the module referenced "statistical filter", used in the architecture of FIG. 6.

The structure of the sorting filter MIP component is illustrated in greater detail in FIG. 7.

This circuit receives, at the input, the lines memorized in a four-line video memory. There will therefore be available, at the input, a 5×5 neighborhood constituted by the current line (applied directly a input) and the four immediately preceding lines (loaded into the video memory).

This 5×5 neighborhood is processed by a window-setting, sorting and extraction circuit which will deliver, at the output, in addition to the value of the central pixel, the minimum value, the maximum value and the $k^{th}$ value (k being a programmable parameter) of the pixels of this neighborhood.

To these four result signals, there is added an additional input signal. These five signals are redistributed through a multiplexer to supply, as a function of the commands CTRL, a simplified arithmetic unit, AU, two comparators COMP and a second multiplexer MPX, which is itself controlled by a programmable logic which is itself supplied with the output values of the comparators.

The following are the characteristics of this MIP sorting filter circuit:
maximum video rate: 20 MHz,
8 masks interchangeable at the video rate,
input: 5 eight-bit inputs plus one additional input on eight bits for the cascade and another additional eight-bit input for the post-processing operations,
outputs two eight-bit outputs ($S_1$ and $S_2$), plus one auxiliary three-bit output enabling the recovery of the signal used for the mask selection (for example the gradient direction in the case of the contour thinning operation), this signal having, in the meantime, been delayed so that it is synchronous with the outputs $S_1$ and $S_2$.

In practice, in the case of the circuit of figure 6, the statistical filter 31 receives, at the input, the norm of the gradient of the current pixel (line 33) and the norm of the argument of gradient of the pixels of the adjacent lines, the argument $\theta$ enabling notably (line 34) the selection, in real time, as a function of this argument value, of one of the four masks illustrated in FIG. 2.

The pixels of the neighborhood indicated by the mask thus selected are sorted out by the circuit which extracts the three (minimum, $k^{th}$ and maximum) pixels therefrom. The post-processor of the statistical filter then makes it possible to apply the formulae developed further, and aimed at searching for the local maximum. The output of the result (line 35) is binary (the central pixel is or is not a contour dot), and the circuit also delivers, on three bits (line 36), the angle $\theta$ that has been used to select the mask, thus giving four bits at the output.

A transcoding circuit 37, which may be constituted by a single fast RAM, converts these four bits into an eight-bit format coding the direction of the gradient as a function of the position of the bit in the byte (see explanations further above relating to the coding of the pixels $I_1$ to $I_8$ with a view to filling).

The two remaining operations, namely the filling of the holes and the configuration test, require a large number of logic operations which have to be done at a fast rate.

To implement them, it has been chosen to use EPLD (Erasable Programmable Logical Device) type components. These components are constituted, in a manner well known per se, by OR and AND logic gates grouped together in cells that end in storage registers. Using an adapted development tool, the user programs each cell as well as the connections among the cells so as to set up the corresponding logic expression desired.

In the present case, the filling of the holes is done in a stage 40 comprising an EPLD component 41, for example an EP900 marketed by ALTERA, which is a circuit constituted by 24 macrocells, with 12 inputs and 24 outputs.

Since the work is done in a 3×3 neighborhood, it is enough to use a video half-memory 42 (memorization of two prior lines). The EPLD component is programmed so as to carry out the logic function indicated further above in the paragraph corresponding to the function of filling the holes.

The final configuration test is carried out by a stage 50 including another EPLD component (for example a EPM5128 component by ALTERA comprising 128 macrocells associated with a video memory 52. Indeed, as seen further above, the configuration test acts on a 9×9 neighborhood with each pixel coded on two bits (x="0", "1" or "2"). It is therefore necessary to use a complete video memory MIP component.

Here again, the EPLD component is programmed to carry out the configuration test explained further above.

What is claimed is:

1. A method to localize rectilinear contours in a digitized image, for the recognition of shapes in a scene analysis processing operation, said image being formed by a two-dimensional frame of pixels, each exhibiting a determined gray level,
wherein said method comprises the steps of:
(a) approximating for each pixel the gradient of the gray level function of the image at the position of each pixel, said gradient being defined by an argument, representing an element of direction information, and by a norm, representing an element of amplitude information of the transition of the gray level in said direction,
(b) extracting from among all of said pixels a sub-set of contour pixels, where each contour pixel corresponds to a local maximum of the gray level function in the direction of the gradient, the maximum being determined from said amplitude information,
(c) complementing the sub-set of contour pixels by interposed filler pixels if a discontinuity of the corresponding contour exists in a given neighborhood, and
(d) performing for each contour pixel or filler pixel a comparison between the neighborhood of the contour or filler pixel with a series of characteristic pixel configurations, and designating the corresponding pixel as being a rectilinear contour pixel if the comparison determines a correspondence of the neighborhood of the pixel with one of the characteristic configurations.

2. The method of claim 1, wherein said neighborhood being compared includes two concentric and non-contiguous square crowns defined around each contour pixel or filler pixel.

3. The method of claim 2, wherein the two concentric and non-contiguous square crowns are constituted by a 5×5 crown and a 9×9 crown surrounding the contour pixel or filler pixel.

4. The method of claim 1, wherein the step (a) for approximating the gradient comprises forming the convolution of the gray level function of the image with the gradient of a smoothing function.

5. The method of claim 4, wherein said smoothing function is a derivative of the Gaussian function.

6. The method of claim 1 further comprising determining whether the norm of the gradient is below a threshold and forcing the value of the norm to zero if the norm is below said threshold.

7. The method of claim 6, wherein said threshold determining operation is an adaptive thresholding operation, wherein respective thresholds are determined as a function of a mean of a norm of a gradient on the previous image.

8. A device for localizing rectilinear contours in a digitized image, for recognizing shapes in a scene analysis processing operation, said image being formed by a two-dimensional frame of pixels each exhibiting a determined gray level, comprising:
means for approximating for each pixel the gradient of the gray level function of the image at the position of each pixel, said gradient being defined by an argument, representing an element of amplitude information and by a norm, representing an element of amplitude information of the transition of the gray level in said direction,
discriminating means for extracting from among said pixels a sub-set of contour pixels, where each contour pixel corresponds to a local maximum of the gray level function in the direction of the gradient, said maximum being determined from transitions of said amplitude information,
filler means for complementing said sub-set of contour pixels by interposing filler pixels if there is a discontinuity in the corresponding contour in a given neighborhood, and
comparator means for comparing for each contour pixel or filler pixel, the neighborhood of the pixel with a series of characteristic configurations, and designating the corresponding pixel as being a rectilinear contour pixel is a comparison determines a correspondence between the neighborhood of the pixel with one of said characteristic configurations.

9. The device of claim 8, wherein localizing of the rectilinear contours is done in real time.

* * * * *